(12) United States Patent  (10) Patent No.: US 8,266,534 B2
Curtis et al.  (45) Date of Patent: Sep. 11, 2012

(54) COLLABORATIVE GENERATION OF MEETING MINUTES AND AGENDA CONFIRMATION

(75) Inventors: Pavel Curtis, Bellevue, WA (US); Anoop Gupta, Woodinville, WA (US); Bruce Johnson, Woodinville, WA (US); Katherine J. Drakos, Seattle, WA (US); Paul J. Hough, North Bend, WA (US); Mary P. Czerwinski, Woodinville, WA (US); Richard J. McAniff, Bellevue, WA (US); Raymond E. Ozzie, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 634 days.

(21) Appl. No.: 11/770,583

(22) Filed: Jun. 28, 2007

(65) Prior Publication Data

US 2009/0006982 A1  Jan. 1, 2009

(51) Int. Cl.
*G06F 3/00* (2006.01)
(52) U.S. Cl. ....... 715/753; 715/758; 715/751; 705/7.15; 705/7.16
(58) Field of Classification Search .................. 715/751, 715/753, 759, 758; 705/7.15, 7.16
See application file for complete search history.

(56) References Cited

U.S. PATENT DOCUMENTS

| | | | |
|---|---|---|---|
| 5,877,758 A * | 3/1999 | Seybold ........................ 715/866 |
| 6,047,297 A * | 4/2000 | Johnson et al. ............... 715/210 |
| 6,101,532 A | 8/2000 | Horibe et al. |
| 6,154,753 A * | 11/2000 | McFarland .................... 715/221 |
| 6,256,651 B1 * | 7/2001 | Tuli ............................... 715/224 |
| 6,363,352 B1 | 3/2002 | Dailey et al. |
| 6,370,533 B1 | 4/2002 | Sato et al. |
| 6,629,129 B1 * | 9/2003 | Bookspan et al. ............ 709/204 |
| 6,654,032 B1 * | 11/2003 | Zhu et al. ...................... 715/753 |
| 6,938,069 B1 | 8/2005 | Narayanaswamy |
| 7,437,412 B2 * | 10/2008 | Ludwig et al. ................ 709/204 |
| 7,441,197 B2 * | 10/2008 | Tschiegg et al. .............. 715/741 |
| 7,669,141 B1 * | 2/2010 | Pegg ............................. 715/781 |
| 2002/0075291 A1 * | 6/2002 | Van Gestel et al. .......... 345/700 |
| 2003/0158887 A1 * | 8/2003 | Megiddo ....................... 709/201 |
| 2003/0208534 A1 | 11/2003 | Carmichael |
| 2004/0109021 A1 | 6/2004 | Price |
| 2004/0174392 A1 * | 9/2004 | Bjoernsen et al. ............ 345/751 |
| 2004/0268259 A1 * | 12/2004 | Rockey et al. ................ 715/708 |

(Continued)

OTHER PUBLICATIONS

Adobe Acrobat Connect User Guide, 2006, Adobe Corporation, pp. i-32.*

(Continued)

*Primary Examiner* — Mark Rinehart
*Assistant Examiner* — Di Xiao
(74) *Attorney, Agent, or Firm* — Lee & Hayes, PLLC

(57) ABSTRACT

Members working on the same project can access similar resources at substantially the same time to facilitate active participation in the project. A meeting associated with the project can be given a unique identifier that can allow the project members to access a meeting or other content and view similar documents or other content as it is discussed in the meeting. As information is edited, modified, created, etc. the members can selectively be presented with the information. A common repository can provide the members with an area or platform in which the project material can be accessed, discussed or other functions performed by the project members, allowing for collaboration of the project details.

20 Claims, 10 Drawing Sheets

U.S. PATENT DOCUMENTS

| | | |
|---|---|---|
| 2005/0027800 A1 | 2/2005 | Erickson et al. |
| 2005/0071740 A1* | 3/2005 | Chee et al. .................... 715/500 |
| 2005/0144231 A1 | 6/2005 | Burckart et al. |
| 2006/0053380 A1* | 3/2006 | Spataro et al. ................ 715/753 |
| 2006/0095514 A1 | 5/2006 | Wang et al. |
| 2007/0100939 A1 | 5/2007 | Bagley et al. |
| 2007/0186157 A1* | 8/2007 | Walker et al. ................. 715/530 |
| 2007/0226226 A1* | 9/2007 | Mintz ............................ 707/10 |
| 2008/0082389 A1* | 4/2008 | Gura ................................ 705/9 |

OTHER PUBLICATIONS

Electronic Meeting System to Support Group Work. Jul. 1991, vol. 34, No. &. Communications of the ACM. http:// delivery.acm.org/10.1145/110000/105793/p40-nunamaker.pdf? key1=105793 &key2=2790458811&coll=GUIDE&dl=GUIDE &CFID=28348074&CFTOKEN=79523443.

Veronique Baudin, et al. Supporting Distributed Experts in E-Meetings for Synchronous Collaboration. http:// ieeexplore.ieee.org/iel5/8325/25991/01175653.pdf. Last accessed on Sep. 3, 2007.

* cited by examiner

COLLABORATIVE GENERATION OF MEETING MINUTES AND AGENDA CONFIRMATION

BACKGROUND

In various organizations today, there is a large amount of time spent preparing for meetings and attending those meetings as well as other tasks related to meetings (e.g., action items). Generally, the attendees meet in a common place, such as a conference room to conduct the meeting, leaving the majority of their work product behind. Computing devices can be used in meetings or other scenarios to present data, share data, modify data and so forth. However, if the computers are not connected through a common network, it is difficult for the participants to view the same documents, modifications and the like.

Sometimes meetings can be productive and worthwhile for both the participant and the organization. At other times, meetings are not as productive as they should be. In addition, there can be communications occurring during the meeting among a subset of the attendees and such communications might not be shared will all participants. This can lead to a first group of people doing things that might be different, and sometimes in contrast, with a second group of people. Such disparity can lead to frustration and, in some cases, loss of interest in the subject matter of the meeting.

Meetings should allow participants the opportunity to achieve common goals while mitigating an amount of wasted time, regardless if the attendees are sitting around a table or around the country. In addition, meetings should be more than merely isolated events but should be a piece of an overall collaborative framework or organizational goal. Further, attendees should have access to the most accurate, up-to-date information as well as information that is accessible by all participants in order to help the team as a whole perform at a higher level of efficiency.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more examples and corresponding disclosure thereof, various aspects are described in connection with increasing collaboration among project or team members by providing a common platform or virtual space to which the team members can contribute content. As members add, modify, annotate or perform other functions, their input can be presented to the other members at substantially the same time (or at a different time). Allowing the members to have access to a common platform where all data relating to the content is contained can facilitate collaboration and efficiency.

During a meeting, the members can share a virtual meeting space simply by entering a tag or other identifier into their respective devices. The various documents presented, modified or referenced during the meeting can be dynamically output or displayed to the meeting members through association with the common tag. Meeting members can add content, in the form of modifications to a document or through comments or questions. For example, if one person has a comment, but does not want to interrupt the flow of the conversation, the comment can be input into a separate place, such as a chat room, that the other participants can see and discuss when at a more appropriate time.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Figure 1:
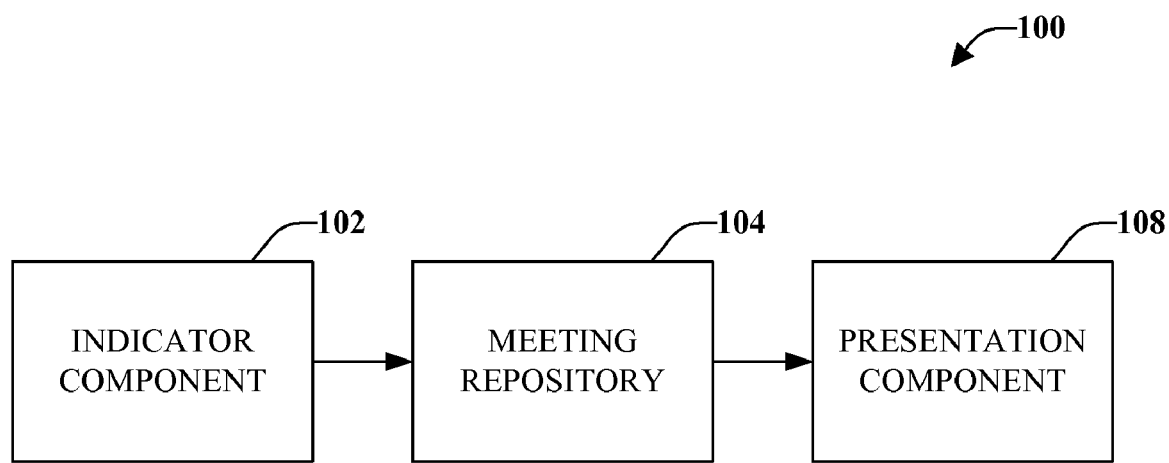
FIG. 1 illustrates an example system that facilitates meeting collaboration in a real-time manner.

Referring initially to FIG. 1, illustrated is an example system 100 that facilitates meeting collaboration in a real-time manner. Generally, people leave their work area to attend a meeting and, thereby, leave the bulk of their work product at their work areas. Sometimes people enter meetings but are not aware of what the other participants are talking about or what documents they are viewing. This can occur because a person had to enter the meeting late, was informed about the meeting too late and could not prepare, the participants are located remotely from each other, etc. In some situations, the meeting attendees might lose track of a conversation thread because there are side conversations occurring that they are not aware of or in which they are engrossed. In other situations, changes might be made to one or more documents (e.g., files, agenda, word processing applications, spreadsheet applications, and the like), but the information is not disseminated to the other attendees. System 100 can facilitate collaboration of these various meeting aspects to facilitate participation and effectiveness through dynamic presentation and display of meeting information. System 100 can further keep attendees actively involved, even when the attendees are located remote from each other.

In further detail, system 100 includes an indicator component 102 that can be configured to associate a unique identifier with a meeting (e.g., discussion between two or more people). The unique identifier can be a word, phrase, number, website, URL address, etc. that can be manually chosen or automatically assigned by system 100. When applying the unique identifier, system 100 can consider various parameters including identifiers assigned to other meetings, whether there is a duplication of identifiers, as well as other criteria (e.g., complexity of the identifier). Users and or entities (e.g., the Internet, another system, a computer, and so forth) that enter or otherwise desire to view a meeting (e.g., physically, virtually, remotely) can be provided automatic access to the meeting and associated content based in part on the unique identifier.

Information relating to the meeting can be retained in a meeting repository 104 (e.g., shared channel) that selectively locates, stores, or manipulates data associated with the meeting based on the unique identifier or other identification means (e.g., meeting name, date of meeting, attendees, subject matter, and the like). The information relating to the meeting can be an agenda, listing of attendees, documents or other information to be presented at the meeting. The information can also be related to documents that are presented during the meeting, changes to such documents, comments added during the meeting, as well as anything else that the participants wish to associate with the meeting (e.g., voice files, photographs, video recording of the meeting, filtering various components of the meeting, and so on).

The information can be displayed or output to one or more meeting participants by presentation component 108. The output can be presented on the participant's respective devices and/or on a common device. The output can be in a real-time manner, whereby the meeting content, interactions, modifications, comments, annotations, etc. are presented at substantially the same time as they occur. In accordance with some aspects, the information is displayed after the meeting, such as if an attendee or other authorized person wants to view, annotate, or perform other functions relating to the meeting or a sub-portion of the meeting. As such, system 100 can allow attendees, no matter where they are located or when they view the meeting, to participate by allowing viewing, collaboration, input, annotations and other actions during or after the meeting.

The various aspects presented herein can be utilized by organizations that wish to allow a portion or all their employees to work remotely. This can mitigate costs associated with maintaining office spaces as well as providing employees work hour flexibility. Such remote access can be provided by having a virtual workspace (e.g., meeting repository) where the employees can perform the work with various computing devices. It should be understood that while the various aspects are discussed with reference to an organization, the aspects can be applied to other non-organization related scenarios.

Figure 2:
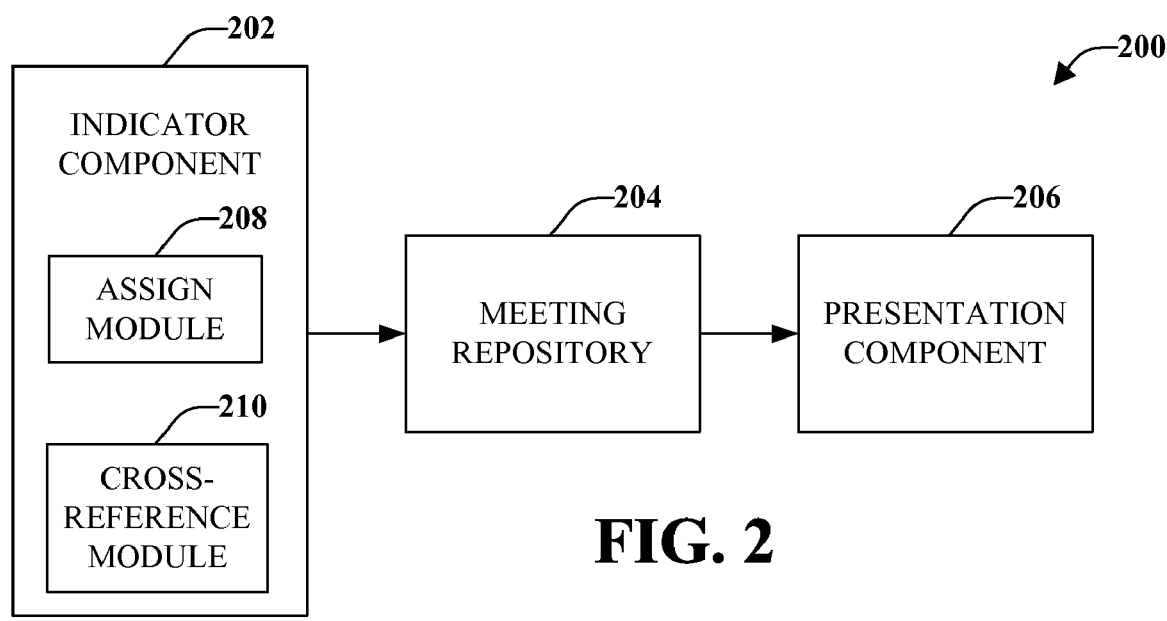
FIG. 2 illustrates an example system for associating a meeting with its participants and content based on a unique identification.

FIG. 2 illustrates an example system 200 for associating a meeting with its participants and content based on a unique identification. Sometime when people enter meetings, or during the meeting, distractions can develop because some attendees are looking at a document to which the other attendees do not have access. Sometimes, there might be changes to a document (e.g., during the meeting) that are not disseminated to the others. Additionally, a location within the document might be searched for by the attendees and, while they are searching, they are not paying attention to a discussion being held. There might also be other people that should be attendees, but have not been included because their skill set (e.g., attendance at other meetings, research of a common topic) might not be known.

System 200 can include an indicator component 202 that can be configured to assign or reference a particular meeting and its content with a unique identification or tag (e.g., number, word, sequence of numbers/words and so forth). The unique identification can be input by a user in order for the attendees to access content of the meeting, which can be maintained in a meeting repository 204. The content of the meeting can be output by presentation component 206 at substantially the same time as other meeting participants are viewing or discussing the content or at a different time (e.g., after the meeting, while preparing for another meeting, while completing action items, and so forth).

In further detail, indicator component 202 can include an assign module 208 that can be configured to index the unique identification to a particular meeting. Assign module 208 can select the unique identification autonomously, such as by accessing identifications associated with other meetings and assign an identification that will not duplicate another meeting. The unique identification might also be selected by assign module 208 based on a simplistic reminder of the meeting that a user or other entity might utilize to access the meeting. In accordance with some aspects, assign module 208 can assign a complex identification to the meeting, such as if the content is intended to be difficult for these not authorized to view the meeting to find or based on other criteria (e.g., standard operating procedures, existing referencing system, and so on).

The assign module 208 could also allow an identifier to be manually selected. For example, the first person that enters a meeting room (or remotely accesses the meeting) can write an identifier on a "white board" or other displayed place (e.g., display pad, chalkboard, piece of paper, and so on). If the identifier selected is "Rumpelstiltskin", other users, as they enter the meeting (e.g., physically, remotely), can view or be told the identifier, and connect to the meeting on their respective devices, if any, using the identifier "Rumpelstiltskin". As such, even people in the same room can utilize the capabilities of system 200.

In the case of a first participant remotely accessing the meeting, a prompt or other screen or audio command (e.g., calling in on a telephone) can be presented requesting the identifier. For example, remote users can be identified as they join the meeting. The first remote user can be presented with a request for the identification. As other remote users join, they can be automatically given the identification and dynamically connect to the meeting.

Assign module 208 may consider criteria when the identification is manually assigned similar to the criteria considered when it is automatically assigned. Such considerations can include duplicate identifications, which might cause two meetings to be incorrectly merged or other confusion. Other considerations can be the simplicity or complexity of the identifier, the ease with which others should be able to find the meeting, and so forth.

Also associated with indicator component 202, can be a cross-reference module 210 that can be configured to determine an association between the current meeting and one or more other meetings to which the current meeting is related, if any. The relationship can be determined based on key words, phrases, etc. in the subject matter of the meeting, or as discussed or presented (e.g., audibly or through other means) during the course of the meeting and/or based on a manual input indicating that another meeting is related to the current meeting. By associating two or more meetings, the participants might find additional resources (e.g., people, documents, and so on) that can increase the efficiency of the meetings. As such, system 200 can be utilized as a tool, not only by the participants themselves but also for other groups and can facilitate interaction between groups and can increase productivity.

Figure 3:
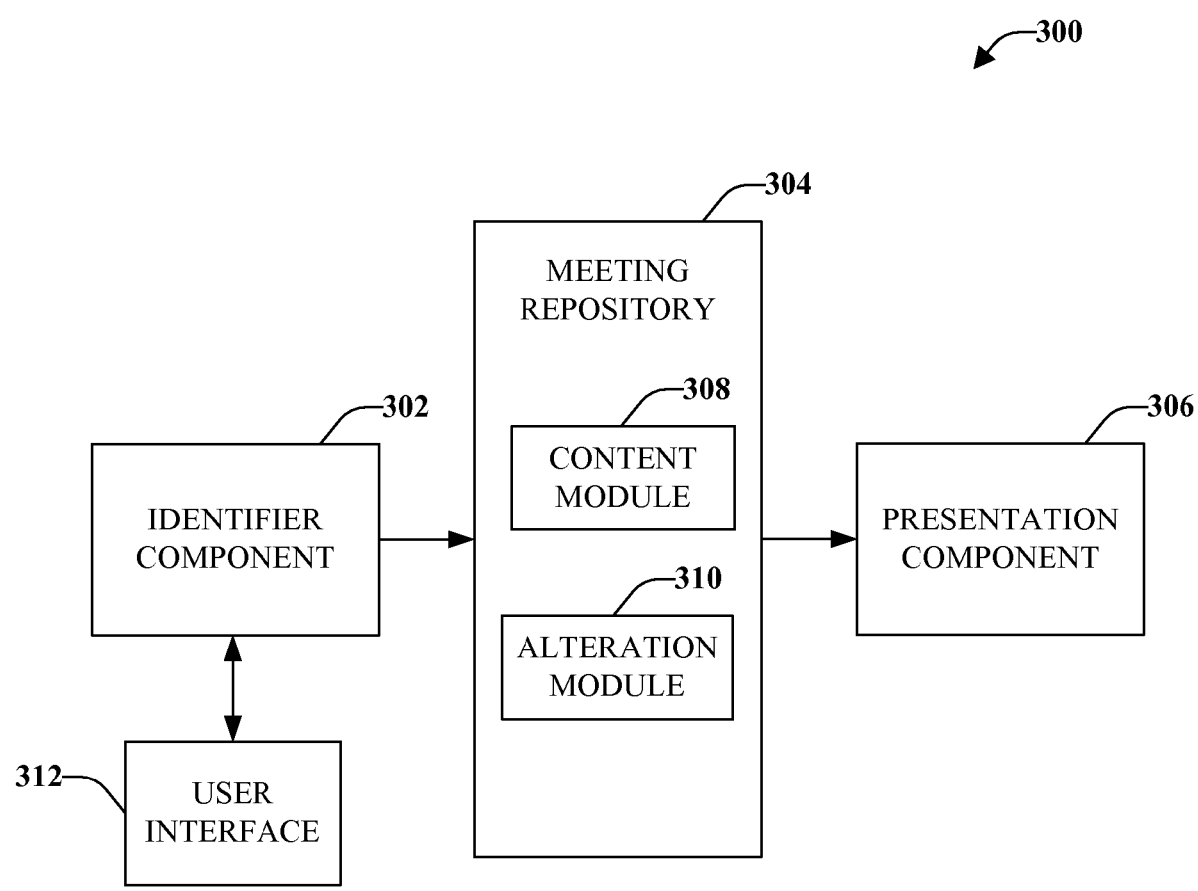
FIG. 3 illustrates an example system for dynamic retrieval and presentation of meeting content to users at substantially the same time.

With reference now to FIG. 3, illustrated is an example system 300 for dynamic retrieval and presentation of meeting content (e.g., data viewing) to users at substantially the same time. Many times people need to meet, but due to time constraints or monetary considerations, the people might not be able to meet in person. In many situations, content of the meeting (e.g., agenda, word processing document, spreadsheet, database files, and so forth) is edited during the meeting and people at remote locations, or even within the same room, might have difficulty viewing the changes. In some situations, edits might have been made but not distributed to all participants. As such, the parties to the conversation might spend a considerable amount of time and effort explaining the changes or getting all parties to the same reference point within the document. This can waste resources and time that could be more proactively utilized in another matter (e.g., carrying out action items or performing productive functions). To mitigate the amount of wasted resources, system can dynamically present a current document to a multitude of users and further display the changes to the document as the changes occur.

To facilitate collaboration among the meeting participants and, potentially with resources from a different meeting, system 300 can include an identifier component 302 that can assign or receive a meeting identifier. Based on the meeting identifier, a meeting repository 304 can be entered (e.g., documents retrieved, viewed, and so on) while the meeting is being held and/or accessed at a different time. If the meeting repository 304 is entered during the meeting, a presentation component 306 can provide attendees, whether physically present or remotely attending the meeting, edits or annotations as they are made to the documents, or various other information (e.g., filtering in on one or more speakers, filtering out a speaker, changing background content, and so on).

Meeting repository 304 can include a content component 308 that can be configured to evaluate information that is presented, discussed, or referenced during a meeting. For example, content component 308 can determine a subject matter of the discussion and, based on key words or phrases in the discussion, determine that a certain section of a document that might allow the participants to more fully understand the subject and follow along with the discussion. The key words or phrases can be identified by topics (e.g., listing, bullet points, subject areas, and so on) that are included in a meeting agenda. As the words or phases are discussed, or presented in another way (e.g., displaying a document) content component 308 can dynamically present each attendee with information relating to the subject matter. Thus, each attendee can be presented with the same information to facilitate collaboration of the subject matter.

Meeting repository 304 can also be associated with an alteration module 310 that can be configured to dynamically update the information viewed by the participants at substantially the same time as one or more changes are made. For example, a meeting agenda might be displayed on a projector in the meeting room. As the agenda items are discussed, the agenda can be marked-up with changes relating to how one or more people understand that agenda item, assignments relating to completion of the agenda item, or other updates. The updates to the agenda can be dynamically presented to the other participants. If new items are discussed, they can be added to the document during the meeting and presented to the other participants.

Thus, system 300 allows for automatic retrieval and output of relevant material when it can be beneficial to the participants. Additionally, system 300 provides one or more participants the ability to add content to various documents (e.g., agenda, action list, and so forth) during the meeting, such as in the form of collaborative meeting minutes. As such, the information occurring during the meeting can be dynamically captured by the participants and documented as they occur, instead of having to wait until a later time, when information might be forgotten or misinterpreted.

System 300 can also include a user interface 312 that can be configured to allow a user to manually enter content and/or view content. It should be understood that while user interface 312 is illustrated as associated with indicator component 302, it could be associated with other system components 304, 306. User interface 312 can provide various interfaces (e.g., a graphical user interface (GUI), a command line interface, a speech interface, Natural Language text interface, and the like). For example, a GUI can be rendered that provides a user with a region or means to load, import, select, read, etc. various information that should be included in the analysis performed by system 300, and can include one or more regions to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 4:
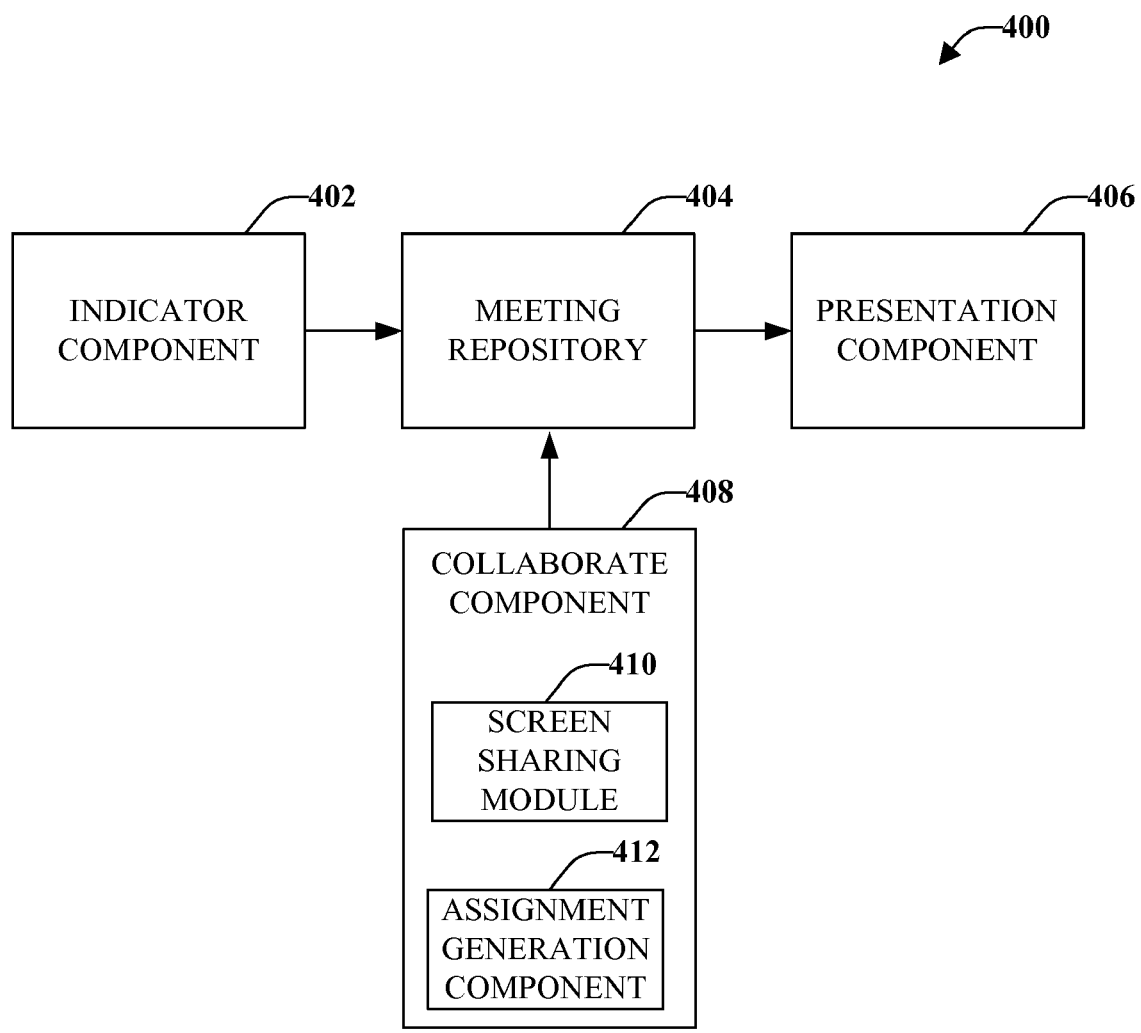
FIG. 4 illustrates an example system that facilitates collaborative generation of meeting minutes and agenda confirmation.

FIG. 4 illustrates an example system 400 that facilitates collaborative generation of meeting minutes and agenda confirmation. During a meeting, the participants should be in agreement and have a common understanding of the items discussed. However, sometimes during a meeting, certain individuals are reluctant to participate and, therefore, might not have provided input, agreed with the proceedings, nor fully understood all items. Additionally, there might be action items assigned that should be completed by a certain date in order to implement various sub-components generated by the meeting. System 400 can provide collaboration among the participants by gathering both verbal communications as well as information provided through another means (e.g., text entry). As such, persons that might not be willing to verbally contribute can contribute through other interaction techniques. System 400 can also automatically assign action items and track such items for completion, reassignment or other actions in order to maintain implementation of such action items.

In more detail, system 400 includes an indicator component 402 that can be configured to correspond a unique tag or other identifier to a meeting. The tag can be used by participants to enter the meeting and have all relevant content dynamically presented to them. The tag can also be used after the meeting to access the meeting content, review the discussion and/or perform actions on the content. The meeting content can be maintained in a meeting repository 404 that can be configured to capture the meeting content and index such content based on the unique tag. As content is captured or retrieved, it can be presented to one or more users by presentation component 406.

To facilitate teamwork, system 400 can include a collaborate component 408 that can be configured to allow the meeting participants to dynamically interact, even though they may be located remote from each other. Collaborate component 408 can allow each participate to verbally contribute content or contribute in another format, such as by inputting a comment through text entry. For example, some people might not like to speak during a meeting or, because another is dominating the conversation, a participant might not be able to interject with their comments. Collaborate component 408 can provide a mechanism for participates to input comments, questions or other information. The person adding the content might be identified or might request that their identity remain confidential (e.g., so as to not bring attention to themselves), such identification can be provided in the form of an avatar, for example. Collaborate component 408 can receive the input and present the input to the other participants in a real-time manner such as by displaying the content on display screens associated with each participate or on a projector screen or a common display. In accordance with some aspects, collaborate component 408 can inject a chat room, Wiki or the like in order to display the entries to the participants. In such a manner, the flow of the meeting is not interrupted when the comments or questions are presented, but the other participants are aware and can address the comments at an appropriate time.

For example, some people might have a difficult time presenting in a meeting or other interactive format. Through interaction with collaborate component 408 these people can input a comment and revise the comment until they are comfortable with presenting it to the others. This can allow them to edit a comment until they feel more confident. In such a manner, system 400 can allow increased participation by allowing those that might not usually contribute to have a comfortable format for presenting their views, which can influence the group behavior.

To facilitate outputting information to the participants at substantially the same time, a screen-sharing module 410 can be associated with collaborate component 408. The screen-sharing module 410 can be configured to synchronize displays of the user devices, whether the users are in the same room or thousands of miles apart. Additionally, if a projector or common display is utilized, screen-sharing module 410 can synchronize the common display and the displays of the various user devices. In accordance with some aspects, a smart phone or other device can capture content displayed by a projector (or the smart phone can operate as a projector) and share such content with other devices through utilization of screen-sharing module 410.

Alternatively or additionally, screen-sharing module 410 can be configured to mask various tasks that can be performed on the devices. For example, people might be scrolling around within a document or moving a mouse around looking for content that is being discussed. Screen-sharing module 410 can display a current action item that is the focus of the group and not allow the participants to scroll or move around in the document so that just the active item is displayed.

As actions or follow-up items are assigned during the meeting, an email or automatic message can be sent to the responsible person by assignment generation component 412. In accordance with some aspects, other meeting content can be automatically sent to the participants after or at select points during the meeting. Each participant in the meeting can be identified by an email alias or other means of contact, which can be determined from a meeting notice, input manually by the participants or through other manners. Thus, action items can be forwarded automatically to the responsible parties.

Additionally or alternatively, assignment generation component 412 can provide an issue tracking system that can populate a task list with a due date and any comments relating to the task based on assignments issued during the meeting. As tasks are approaching the due date, an email or other notification can be generated and sent to the person responsible and/or other participants. If a particular task is behind schedule and/or needs to be reassigned, assignment generation component 412 can selectively modify a due date, determine another person the task can be assigned to, or provide other actions in relation to monitoring task activities and providing a collaborative context where action items can be monitored by the entire team. Thus, system 400 can facilitate completion of a common goal.

Figure 5:
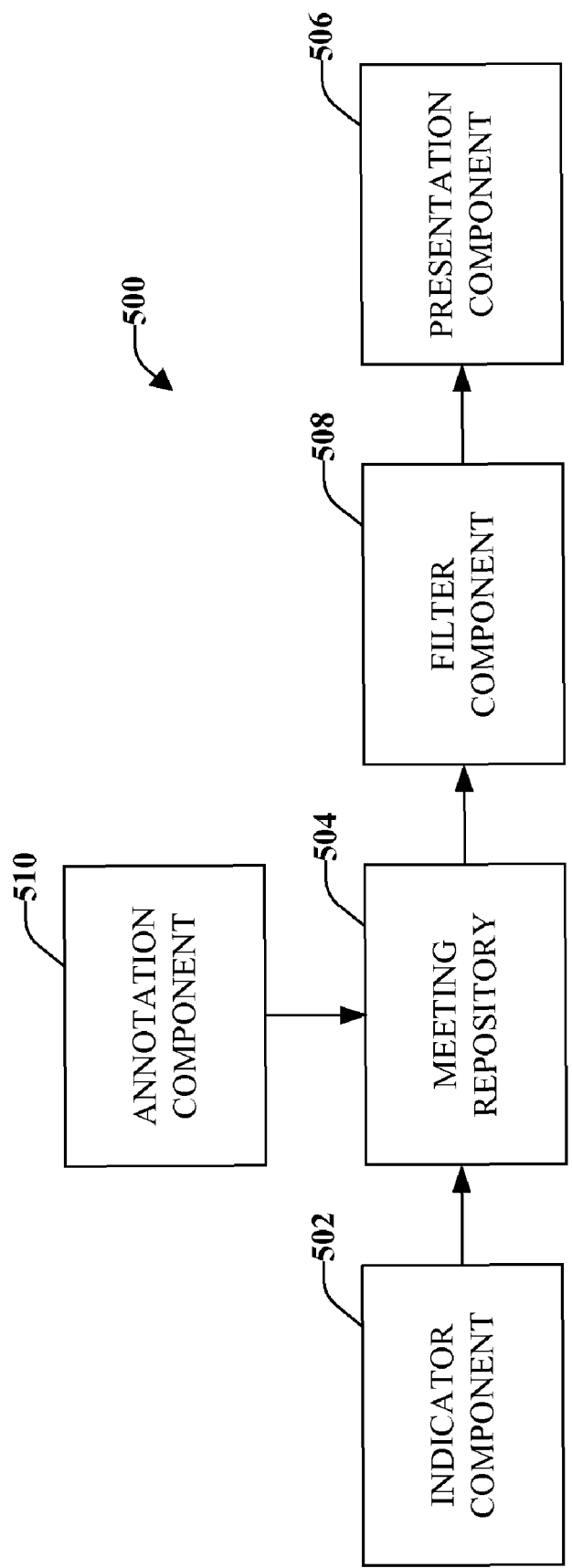
FIG. 5 illustrates a system for providing a virtual workspace where interactions can be conducted in the context of where the work is being performed.

Referring now to FIG. 5, illustrated is a system 500 for providing a virtual workspace where interactions can be conducted in the context of where the work is being performed. Generally, when team members meet, they congregate in a meeting room or other common area. When meetings are conducted in this fashion, the team members leave a large potion of their work product at their desks, which can cause non-participation because the members do not have reference sources readily available. If the team members are distant from each other, a meeting is set-up for a certain time and the meeting is conducted as a teleconference or audio-conference and so forth. Thus, each time two or more members want to meet, they wait until a pre-designated mutually convenient time, although other impromptu times might be more productive.

System 500 is similar to the systems illustrated and described with reference to the above figures and includes an indicator component 502 that corresponds meeting content with a tag. A meeting repository 504 can index one or more meetings and the content associated with the meeting to its corresponding tag. As content is contributed, modified, referenced and so forth during a meeting, such content can populate the meeting repository. This content can be viewed by the meeting participants at substantially the same time and changed, as necessary, in real-time.

Additionally, meeting repository 504 can include a listing of meeting participants that have been invited to the meeting as well as a listing of those that actually attended the meeting, which can be populated based in part on the entered tag. The various participants can access this information to determine the other participants, which can save some time when introductions are being made (or might mitigate the need for introductions). Meeting repository 504 can further provide imagery associated with each person as they interact with other people (e.g., webcam).

In accordance with some aspects, meeting repository 504 can be a main place or profile where the work is actually performed, such as a virtual meeting or workspace. Thus, meeting repository 504 is not just a place for work that has been completed but also is a place where the work is being performed (e.g., the location of documents, while documents are being edited another person can view the edits in real-time, and so forth). As people are working on the various items associated with the project (e.g., documents, reports, action items), information can be dynamically presented to others working on the project. As such, the members can know who else are actively working on the project and, if necessary, an informal meeting can be called based on the people working on the project at substantially the same time. Thus, a meeting can be conducted when it is convenient for the participants, instead of having to wait for a particular time or place. During the meeting, because the repository 504 is where the work is performed, the data is readily available and easy to share. As a group workspace, the repository 504 can facilitate sharing of information where the users in the space at a given time can co-browse documents, co-edit documents and perform other collaborative functions because they are already in the meeting context. Notes or other reminders can also be left in the repository 504 for viewing by others.

There can be privacy concerns and issues that should be addressed when allowing others to see what a person is doing. An example of addressing some privacy concerns can be to hash each person's identity in conjunction with what they are working on. Each person can see the other's activity and might be able to find out what activities are common based on the hash and, thus, might be able to collaborate on those activities. In this manner, there might be people that should be brought together to complete a particular project or sub-portion of a project and system 500 can facilitate such collaboration, even if the people are not aware of each other or the contributions the others can add.

In accordance with some aspects, the information can be sorted before it is output by presentation component 506. A filtering component 508 can be configured to categorize the information based on parameters (e.g., who is speaking, who is working on a document, . . . ). For example, a group member might only be interested in what one person contributes and can manually request only a subset of the information. Filtering component 508 can identify a speaker, such as through voice-recognition or other manners of recognition, and filter out all the other speakers. Alternatively or additionally, filtering component 508 can remove information contributed by one or more identified people. As such, relevant information can be presented to a user while information not relevant or not desired can be disregarded and not output to the user.

If desired, an annotation component 510 can be configured to allow comments, explanations or other material to be added to the meeting content either during or after a meeting. For example, during a conference room meeting, a video recording can be taken or another type of recording, such as by panning around with multiple arrays to capture content. Participants can inject their own comments in the recording of the meeting, which can be performed during or after the meeting (e.g., Wiki). Thus, the meeting can be a living document whereby annotations or other notes can be identified by contributor and when it was contributed.

Figure 6:
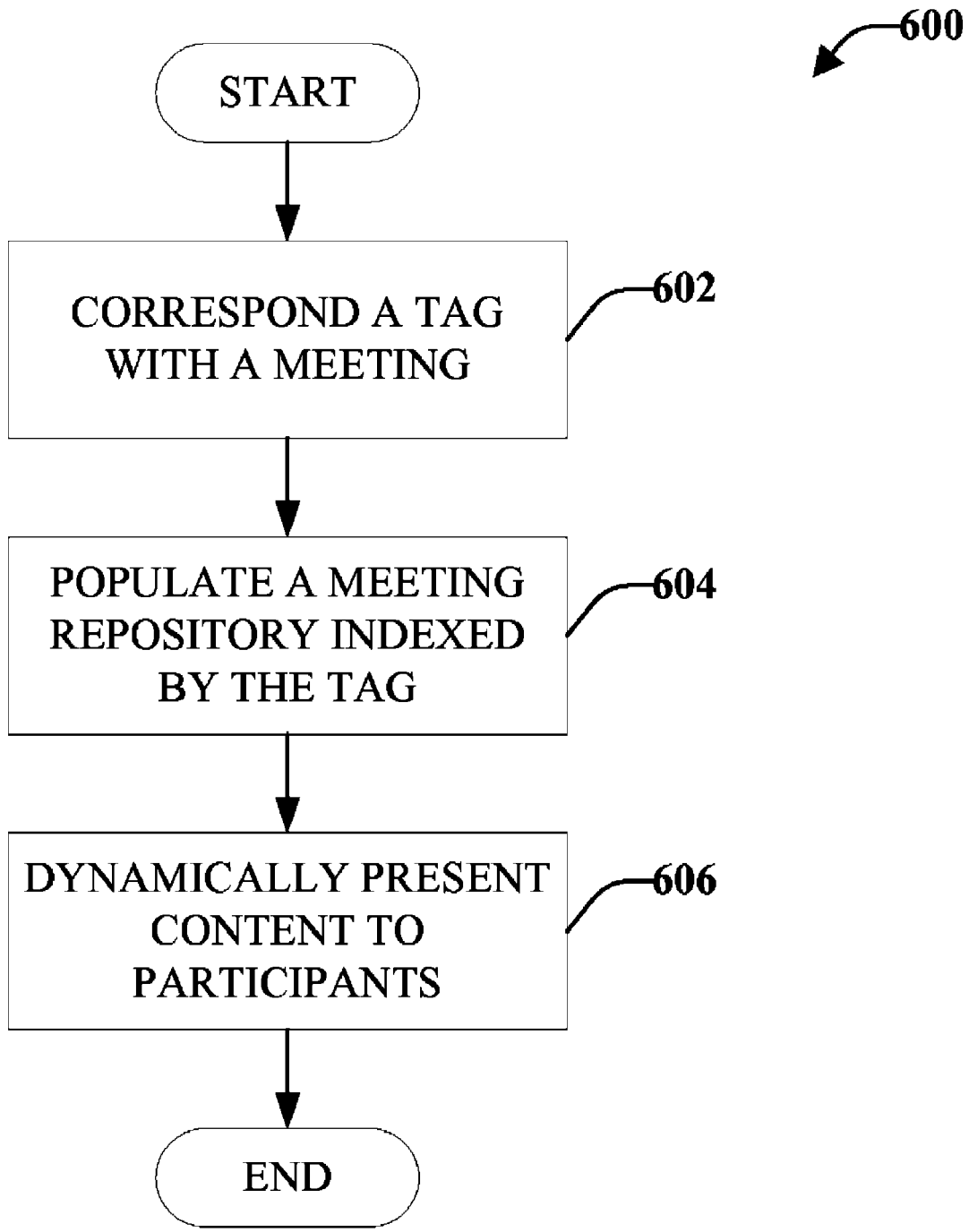
FIG. 6 illustrates a method for outputting meeting content to a multitude of meeting participants at substantially the same time.
Figure 7:
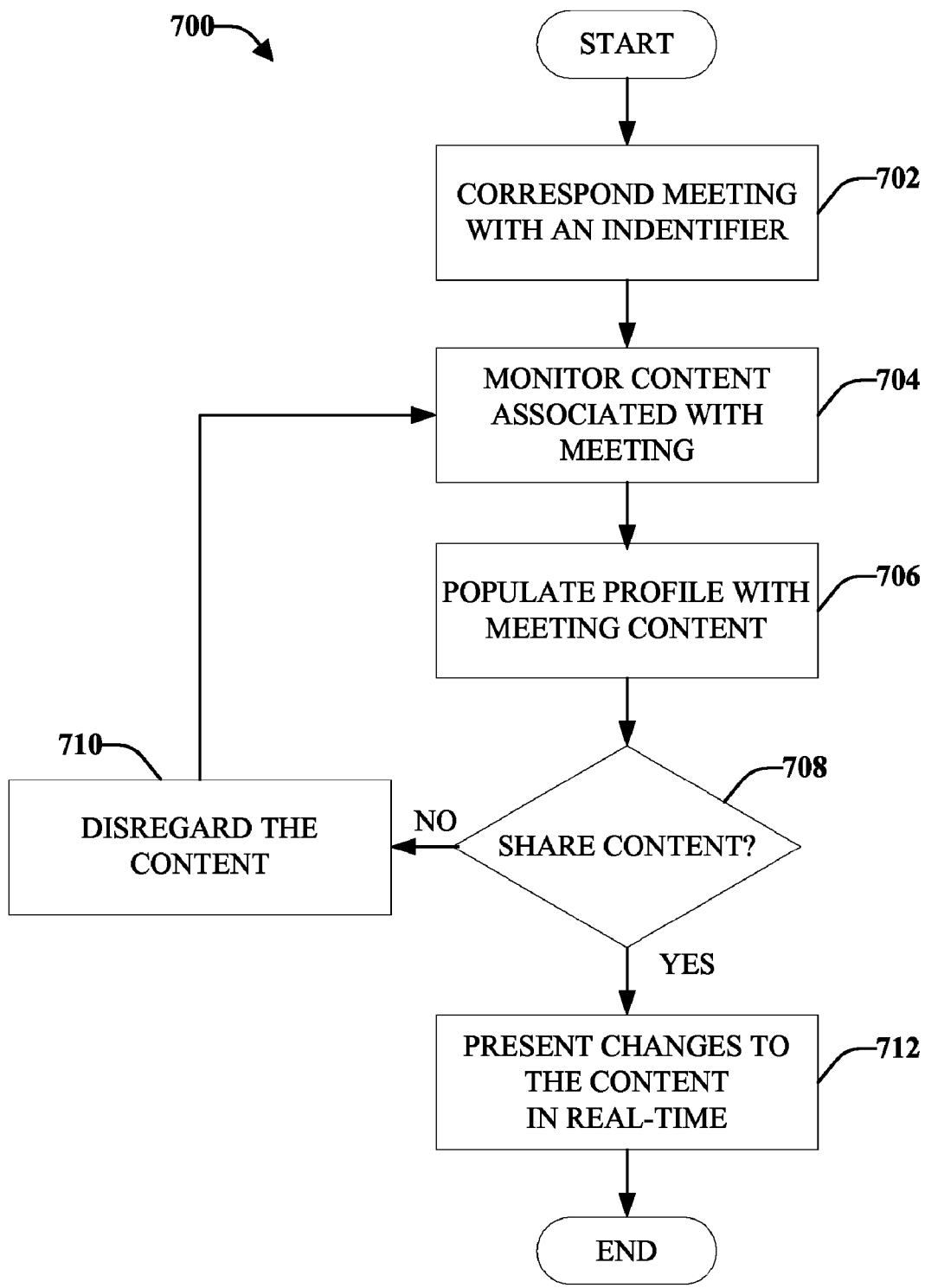
FIG. 7 illustrates a method for capturing information presented during a meeting and selectively distributing the meeting content.
Figure 8:
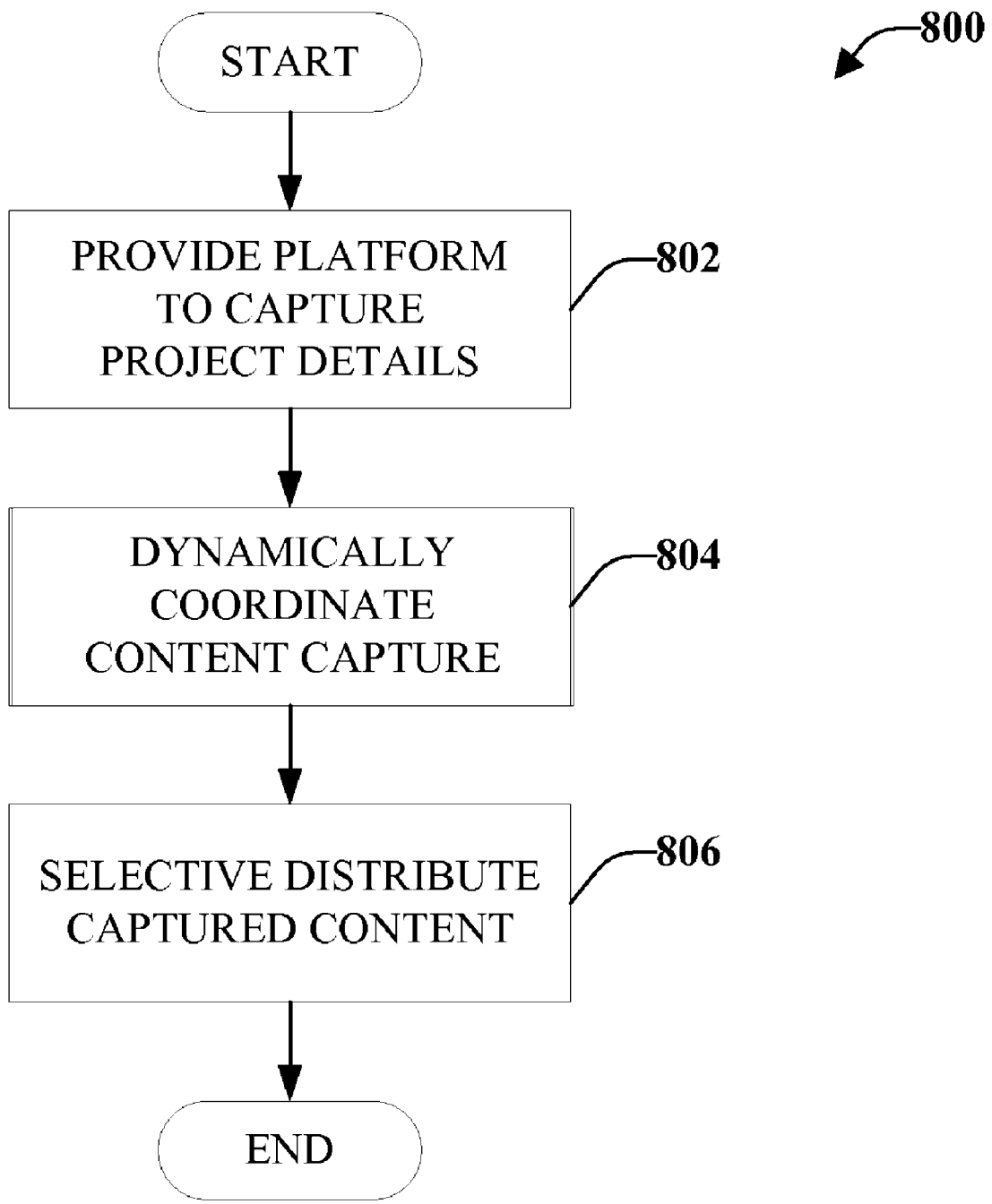
FIG. 8 illustrates a method for providing a common platform or virtual workspace to facilitate activities directly in the common platform.

In view of the exemplary systems shown and described above, methodologies that may be implemented in accordance with the disclosed subject matter, will be better appreciated with reference to the flow charts of FIGS. 6-8. While, for purposes of simplicity of explanation, the methodologies are shown and described as a series of blocks, it is to be understood and appreciated that the disclosed aspects are not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 6 illustrates a method 600 for outputting meeting content to a multitude of meeting participants at substantially the same time. Method 600 can provide collaboration and increased participation of the meeting participants by providing meeting content when it is relevant and can be utilized to increase meeting efficiency.

Method 600 begins, at 602, when a tag or other identifier is associated with a meeting or set of meetings. For example, the tag can be manually assigned by the first person that enters a meeting. This tag can be disseminated to the other participants to allow them to enter a repository or profile page associated with the meeting. In accordance with some aspects, the tag is automatically generated based on one or more criteria (e.g., duplication of tags, relevance of tag to meeting, simplicity/complexity of tag, standard operating procedures and so forth).

As participants enter the meeting and the meeting progresses, a project repository or profile page can be populated with information, at 604. Such information can include the names, email aliases and other information relating to the participants (e.g., projects worked on, employment history, educational background, and the like). Information in the repository might also include a listing of people that are not participants to the meeting, but have information that might be relevant to the meeting.

The information that can be captured and retained as the meeting progresses can include documents viewed or referenced by individual participants of the group as a whole. Information can include edits made to a document (e.g., changes to an agenda, added action items, and so forth). The information can be a recording of the meeting (e.g., visual, audio). Almost any transaction in the meeting can be captured and placed in the meeting repository, taking into account various privacy issues.

The information or content captured and placed in the meeting repository can be dynamically presented to the other participants either during or any time after the meeting. For example, as edits are being made to a document that is the subject matter being discussed (e.g., agenda), the edits can be presented to each participant at substantially the same time as the edits are made. In accordance with some aspects, as information is discussed one or more records relating to the discussion can be displayed or output in some other manner to the participants while some functionality of respective devices are disabled. For example, if a particular topic is being discussed, information relating to that topic can be output and functionality associated with scrolling through the document is enabled. In such a manner, the attention of each participant can be drawn to the relevant topic, while mitigating distractions. In accordance with some aspects, a portion of the document can be highlighted to indicate what is currently being discussed.

FIG. 7 illustrates a method 700 for capturing information presented during a meeting and selectively distributing the meeting content. At 702, a meeting is referenced by a tag or identifier. Meeting participants, and others authorized to view the data, can access and participate in the meeting based in part on the tag. As attendees enter the meeting (e.g., physically, remotely) the tag can be provided and the attendees can enter the tag on their respective devices. The tag allows participates to view content associated with a profile (e.g., common platform) for the meeting.

As the meeting progresses, content associated with the meeting is monitored, at 704. Such content can be analyzed and/or recorded. For example, multiple devices can capture and record the meeting from different perspectives, which can be combined to provide more depth and content to the meeting. The meeting profile can be populated with the captured data, at 706.

As further content is received (e.g., files, documents) and/or changes made to the content, a determination is made, at 706, whether the changes should be shared with the other participants. For example, a user might be browsing various information that can be related or unrelated (e.g., checking personal email) to the meeting. Information unrelated to the meeting can be identified as not related to the topic or subject matter of the meeting (e.g., does not contain key words or phrases). In accordance with some aspects, a participant can manually identify the content as not to be published.

If the determination is the content should not be shared ("NO"), the information is disregarded or ignored, at 710, and monitoring of the meeting continues, at 704. If it is determined that the content should be shared ("YES"), the content or changes to the content are presented to the other users in real-time, at 712. Displaying the content at substantially the same time as it is received can allow other participants to input their comments, changes, etc. to facilitate collaboration or unification of communications among the team members. The method 700 can continue, at 704, with continued monitoring of the meeting.

FIG. 8 illustrates a method 800 for providing a common platform or virtual workspace to facilitate activities directly within the common platform. Commonly, various projects and teams are developed to carry out a stated goal or output. The teams can include members from different groups, areas, and so forth, each of which can provide content and valuable information. To facilitate collaborative and effectiveness of the team, method 800 can provide a common platform or space where the activities relating to the project can be maintained and provided to team members.

At 802, a repository or platform that contains content associated with a project is provided. The platform can be a common location where all content (e.g., files, documents, photos, videos, and so forth) is retained. The project members can make changes, additions and so forth to such content within the platform. At 804, the modifications to the content are dynamically captured. For example, as a project member adds, modifies, etc. content or searches for data, all the content or a sub-portion of the content is captured and retained in the platform. For example, there might be some information that should not be captured based on privacy issues, the entity modifying the data (e.g., is the entity authorized?) or based on other factors (e.g., the project has been suspended).

The captured content can be selectively distributed to the project members, at 806. For example, if two or more members are working on the same document, information can be dynamically shared between the members allowing co-viewing, co-editing and the like. If two or more members are discussing a common topic (e.g., over the phone, through an instant-message application, and so forth), information can be shared between those members. In accordance with another aspect, members that are not currently working within the platform (e.g., working on other projects, on vacation, and so on) can be notified of any changes the next time they enter the platform or when requested. In such a manner, the members can be aware of what the other members and doing (or have done) and can increase collaboration and achievement of common goals.

It will be appreciated that, in accordance with one or more aspects described herein, inferences can be made regarding associating a tag or identifier with a meeting, providing a shared repository, selectively displaying content to users, facilitating collaboration of project data, and so forth. As used herein, the term to "infer" or "inference" refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Artificial intelligence based systems (e.g., explicitly and/or implicitly trained classifiers), rules-based logic systems or other machine learning techniques can be employed in connection with performing inference and/or probabilistic determinations and/or statistical-based determinations as in accordance with one or more of the disclosed aspects.

According to an example, one or more aspects presented above can include making inferences pertaining to information content that should be shared with entities associated with a meeting repository. In accordance with another example, an inference can be made related to allowing changes or other manipulations to content to be dynamically presented in a real-time manner. According to a further example, an inference can be made pertaining to generating action items or distributing other content associated with a project. It will be appreciated that the foregoing examples are illustrative in nature and are not intended to limit the number of inferences that can be made or the manner in which such inferences are made in conjunction with the various aspects described herein.

Figure 9:
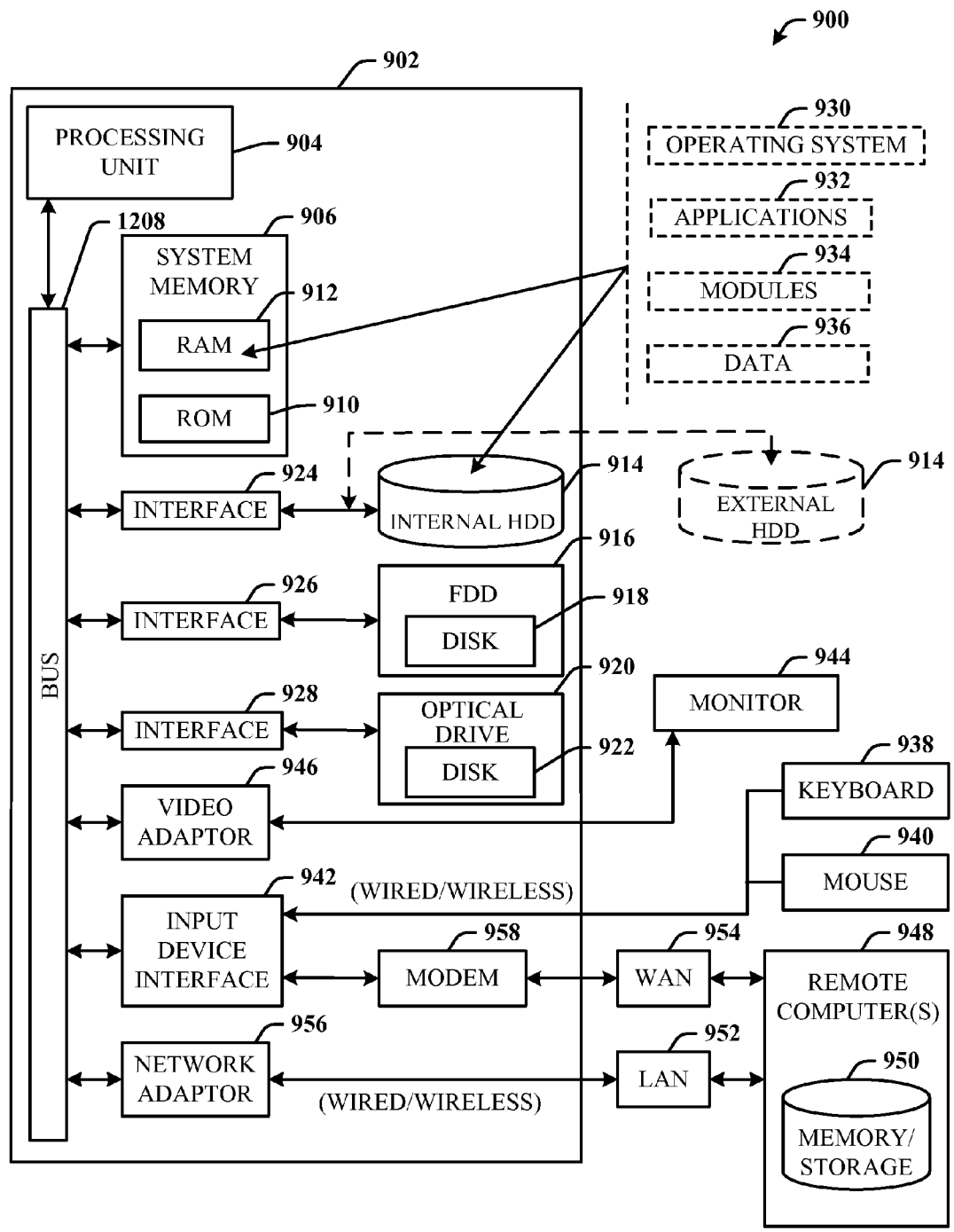
FIG. 9 illustrates a block diagram of a computer operable to execute the disclosed aspects.

Referring now to FIG. 9, there is illustrated a block diagram of a computer operable to execute the disclosed architecture. In order to provide additional context for various aspects disclosed herein, FIG. 9 and the following discussion are intended to provide a brief, general description of a suitable computing environment 900 in which the various aspects can be implemented. While the one or more aspects have been described above in the general context of computer-executable instructions that may run on one or more computers, those skilled in the art will recognize that the various aspects also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the various aspects can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 through an interface, such as a video adapter 946. In addition to the monitor 944, a computer typically includes other peripheral output devices (not shown), such as speakers, printers, etc.

The computer 902 may operate in a networked environment using logical connections through wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 through the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
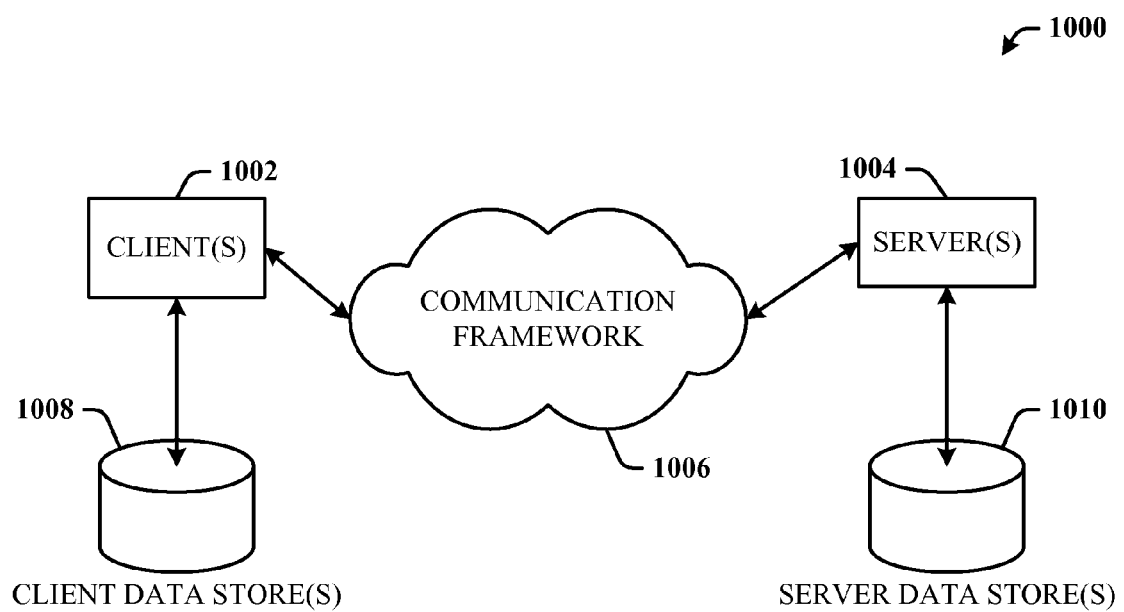
FIG. 10 illustrates a schematic block diagram of an exemplary computing environment operable to execute the disclosed aspects.

Referring now to FIG. 10, there is illustrated a schematic block diagram of an exemplary computing environment 1000 in accordance with the various aspects. The system 1000 includes one or more client(s) 1002. The client(s) 1002 can be hardware and/or software (e.g., threads, processes, computing devices). The client(s) 1002 can house cookie(s) and/or associated contextual information by employing the various aspects, for example.

The system 1000 also includes one or more server(s) 1004. The server(s) 1004 can also be hardware and/or software (e.g., threads, processes, computing devices). The servers 1004 can house threads to perform transformations by employing the various aspects, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated through a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." The term "or" as used in either the detailed description of the claims is meant to be a "non-exclusive or".

The word "exemplary" as used herein to mean serving as an example, instance, or illustration. Any aspect or design described herein as "exemplary" is not necessarily to be construed as preferred or advantageous over other aspects or designs.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. A system, comprising:
one or more processors; and
memory, coupled to the one or more processors, to store:
an indicator component that selectively cross-references a meeting to a unique identifier;
a meeting repository that indexes content associated with the meeting based on the unique identifier;
a presentation component that selectively outputs the indexed content to two or more entities, whereby the two or more entities view similar content;
a cross-reference module that associates the meeting with one or more other meetings based on an association between the indexed content of the meeting and related content from the one or more other meetings and enables the two or more entities to identify additional resources associated with the indexed content and the related content; and
an assignment generation component that:
automatically sends, during the meeting and to a particular one of the two or more entities, a message describing an action item relating to the indexed content when the action item is assigned to that particular entity, wherein the action item is to be completed by a certain date in order to implement one or more sub-components associated with the action item;
tracks the action item for completion, reassignment, and other scheduled actions to maintain implementation of the action item;
determines that the action item is behind schedule or should be reassigned; and
is configured to modify a due date associated with the action item, reassign the action item to a different entity, and provide an environment in which each of the two or more entities monitors completion of the action item.

2. The system of claim 1, further comprising a collaborate component that allows the two or more entities to view a document and changes to the document at substantially a same time as the changes are made.

3. The system of claim 1, wherein the meeting repository provides a common workspace for the two or more entities.

4. The system of claim 1, wherein the indicator component chooses the unique identifier autonomously or accepts a manual entry that contains the unique identifier.

5. The system of claim 1, wherein the presentation component selectively outputs the indexed content at substantially a same time as the content is presented during the meeting.

6. The system of claim 1, further comprising an alteration module that dynamically updates the indexed content when one or more changes are made to the indexed content.

7. The system of claim 1, wherein the assignment generation component populates a task list based on assignments issued during the meeting.

8. The system of claim 1, further comprising a filter component that selectively categorizes the indexed content based on received parameters, and the presentation component further being configured to output the categorized content.

9. The system of claim 1, further comprising an annotation component that adds commented material to the indexed content.

10. The system of claim 1, wherein the indicator component selectively cross-references the meeting to the unique identifier so that there are no duplicate identifiers.

11. The system of claim 1, further comprising a screen-sharing module that synchronizes displays associated with the two or more entities.

12. A method, comprising:
providing a common platform to capture project content;
dynamically coordinating the captured content;
selectively distributing the captured content to a plurality of users through the common platform;
associating a meeting that corresponds to the captured content with one or more other meetings based on an association between the captured content and related content associated with the one or more other meetings, the captured content and the related content being used to identify additional resources associated with the captured content and the related content;
automatically sending, to a particular one of the plurality of users while the plurality of users are interacting via the common platform, a message describing an action item relating to the captured content when the action item is assigned to that particular user, the action item is to be completed by a certain date in order to implement one or more sub-components associated with the action item;

tracking the action item for completion, reassignment, and scheduled other actions to maintain implementation of the action item; and in response to determining that the action item is behind schedule, modifying a due date associated with the action item, reassigning the action item to a different one of the plurality of users, and configuring the common platform so that each of the plurality of users monitors completion of the action item.

13. The method of claim 12, wherein the selectively distributing the captured content comprises determining whether the captured content should be shared with the plurality of users.

14. The method of claim 13, further comprising ignoring the captured content if it should not be shared.

15. The method of claim 13, further comprising presenting the captured content to the plurality of users if the content should be shared.

16. The method of claim 12, further comprising associating a tag with the captured content.

17. The method of claim 12, further comprising:
monitoring content associated with the meeting; and populating the common platform with the monitored content.

18. The method of claim 17, further comprising:
receiving an annotation associated with at least a sub-portion of the meeting; and
applying the annotation to the monitored content.

19. A system having one or more processors and memory coupled to the one or more processors, the system comprising:

means for identifying a meeting based in part on a unique identifier;

means for monitoring content of the meeting;

means for presenting the monitored content to a plurality of users that accessed the meeting based on the unique identifier, the means for presenting further including evaluating the content referenced during the meeting to identify a subject matter of the content and key words or phrases found in the content and, during the meeting, providing the subject matter to the plurality of users and directing the plurality of users to a particular portion of the content based on the identified key words or phrases;

means for selectively modifying the content based on one or more changes made to the content during the meeting;

means for populating a meeting repository with the meeting content;

means for associating the meeting with one or more other meetings based on an association between the meeting content and related content associated with the one or more other meetings, the meeting content and the related content being used to identify additional resources associated with the meeting content and the related content;

means for automatically assigning an action item to a particular one of the plurality of users, the particular user being informed of the action item via a message transmitted to the particular user and the action item is to be completed by a certain date in order to implement one or more sub-components associated with the action item;

means for tracking the action item for completion, reassignment, and other scheduled actions to maintain implementation of the action item;

means for determining that the action item is behind schedule or should be reassigned; and means for modifying a due date associated with the action item, reassigning the action item to a different one of the plurality of users, and providing an environment in which each of the plurality of users monitors completion of the action item.

20. The system of claim 19, further comprising:

means for allowing each of the plurality of users to selectively access data contained in the meeting repository; and means for providing collaboration among at least two of the plurality of users through the meeting repository.

* * * * *